March 2, 1943.  F. E. OILER  2,312,472
PHOTO RECORDING DEVICE
Filed Feb. 14, 1941   4 Sheets-Sheet 1

INVENTOR
FRANK E. OILER.
BY
ATTORNEY

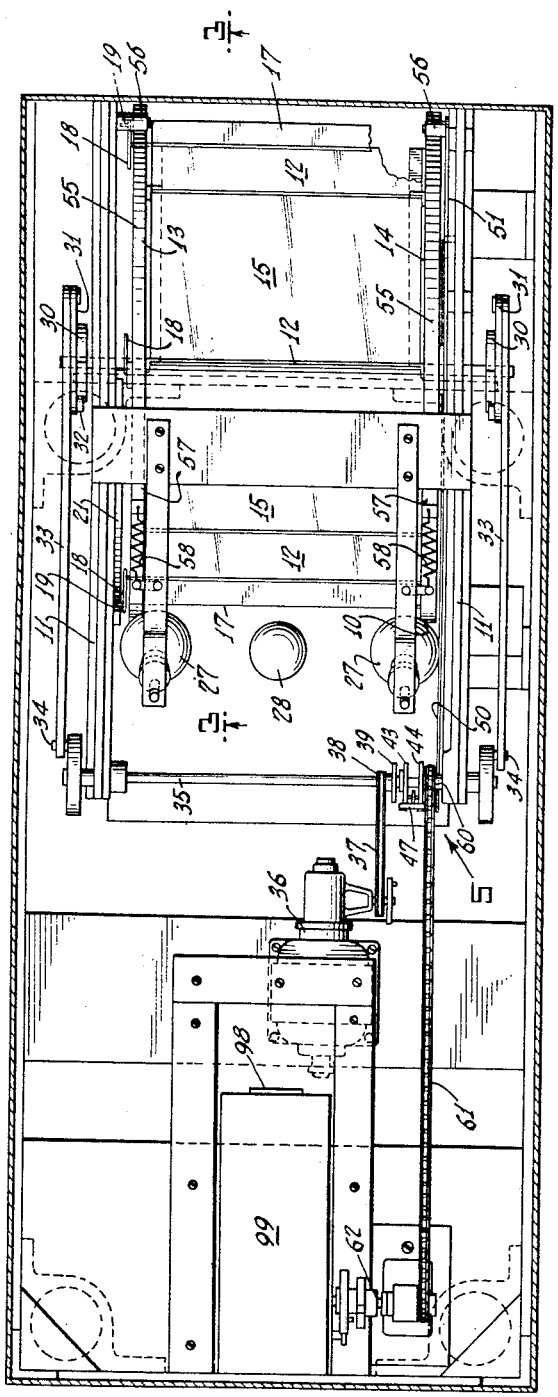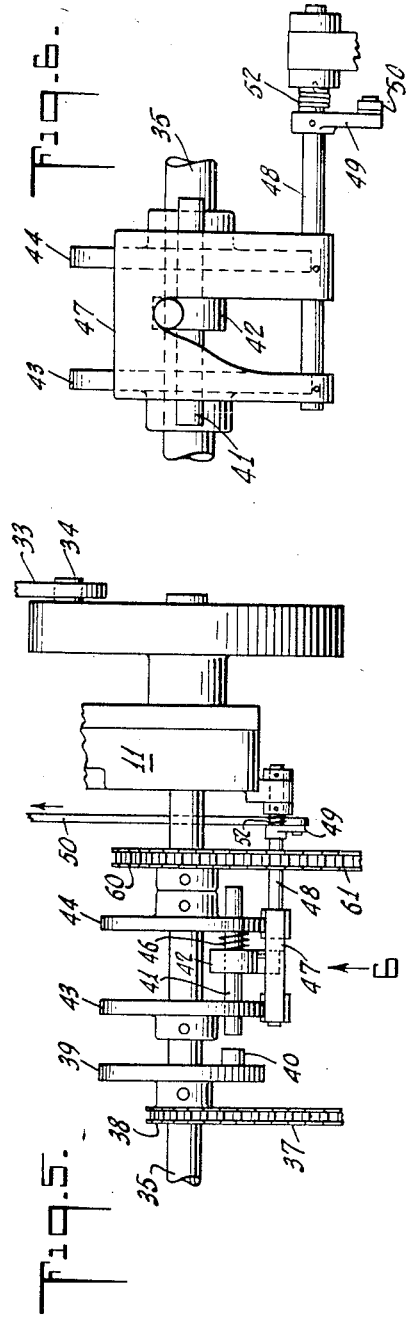

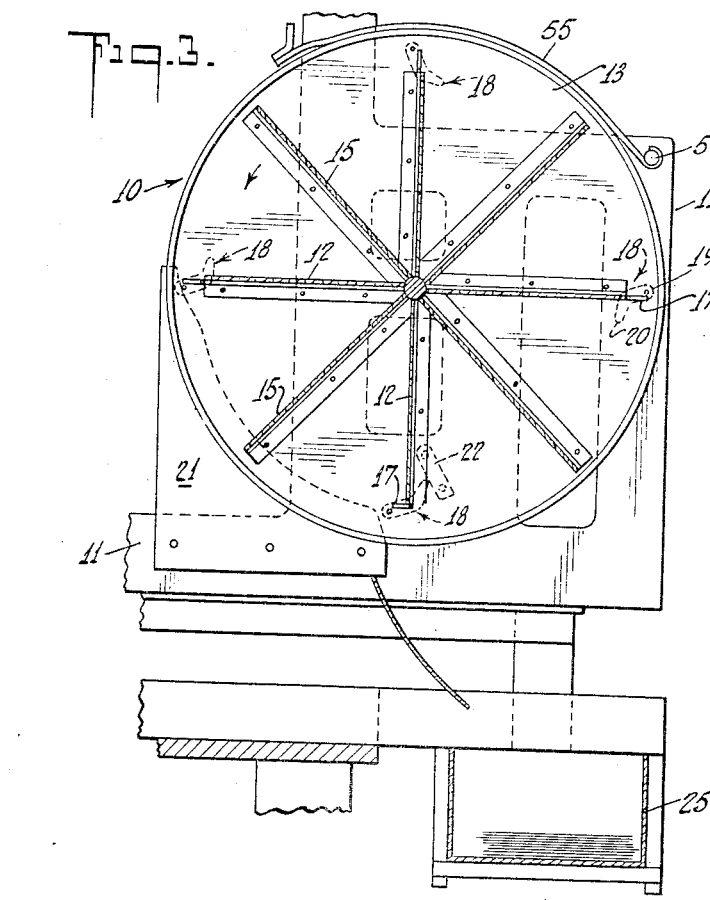
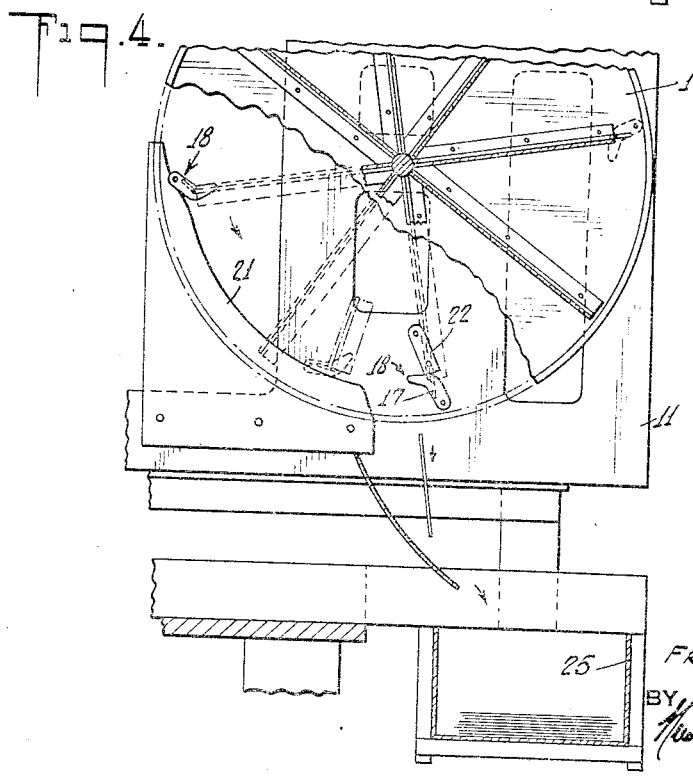

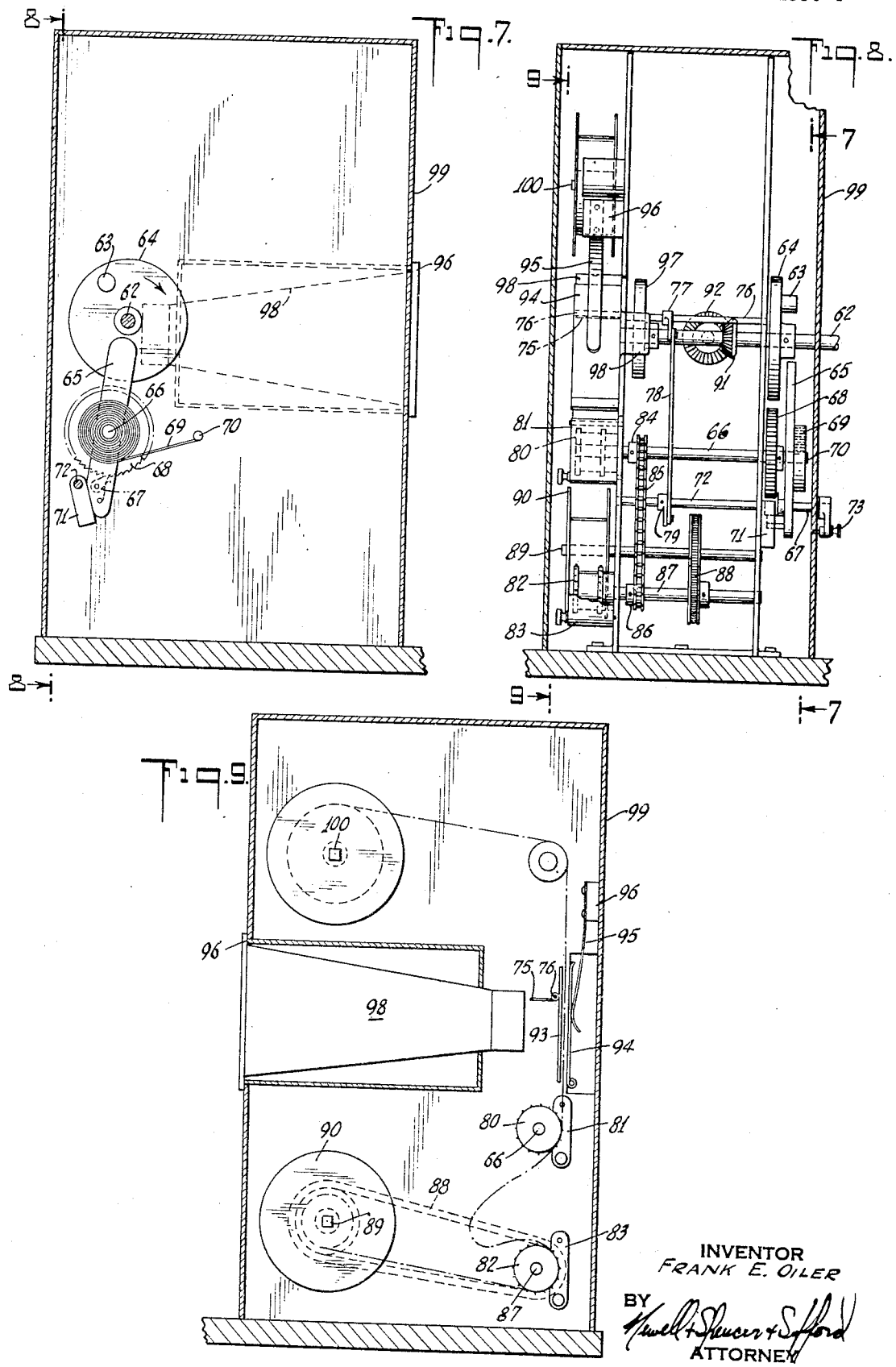

Patented Mar. 2, 1943

2,312,472

UNITED STATES PATENT OFFICE 2,312,472

PHOTO RECORDING DEVICE

Frank E. Oiler, Pelham, N. Y., assignor to International Photo Recording Machines, Inc., New Rochelle, N. Y., a corporation of New York Application February 14, 1941, Serial No. 378,859

8 Claims. (Cl. 88—24)

This invention relates to a device for photographing records, such for example as checks, index cards, sales slips, bills, etc., particularly for preserving record copies on micro-film.

It is an object of my invention to provide a simple record photographing device which will be relatively inexpensive and yet which will be accurate and efficient in its operation.

Another object of the invention is to provide a rapid and convenient device for positioning of the records for photographing and for removing the records and delivering them at a desired location after photographing.

Another object of the invention is to so synchronize the positioning of the records with the operation of the camera as to assure accurate focusing and prompt exposure without unnecessary delay when and as soon as the records are properly positioned.

Another object of the invention is to provide a device which is capable, by simple adjustment, of photographing either one or both sides of a record simultaneously and with a movement of the film after each exposure corresponding to the height of the single or the double image photograph, whereby to assure full utilization of the film.

Another object of the invention is to assure accurate positioning of the film and of the record being photographed so as to assure accurate focusing and consequent clear reproduction of the photographed image upon enlargement from a micro-image on the film.

In the accompanying drawings I have shown a preferred embodiment of my invention by which these objects are attained. In selecting and presenting these drawings and various modifications suggested in this application, I wish it to be understood that these are not intended to be exhaustive nor limiting of the invention; but, on the contrary, that they are given with a view to illustrating the invention and explaining the principles thereof and the best manner of embodying the same in use, in order that others may fully understand the same and may be enabled to embody the invention in numerous other forms and with numerous other modifications, each as may be best adapted to conditions of their particular use.

Referring to these drawings:

Fig. 2 is a top plan view of the same;

Fig. 3 is a diagrammatic view partly in elevation and partly in section with parts broken away to show the carriage wheel taken on line 3—3 of Fig. 2. This figure shows also fixed cam members which cooperate with crank members on the carriage wheel;

Fig. 4 is a view similar to Fig. 3;

Fig. 5 is an enlarged view (of a portion of Fig. 1), showing the reel drive and shutter operating mechanism of the camera;

Fig. 6 is an end view of a portion of Fig. 5;

Fig. 7 is a view taken on line 7—7 of Fig. 8;

Fig. 8 is a view taken on line 8—8 of Fig. 7; and

Fig. 9 is a view taken on line 9—9 of Fig. 8.

Figure 1:
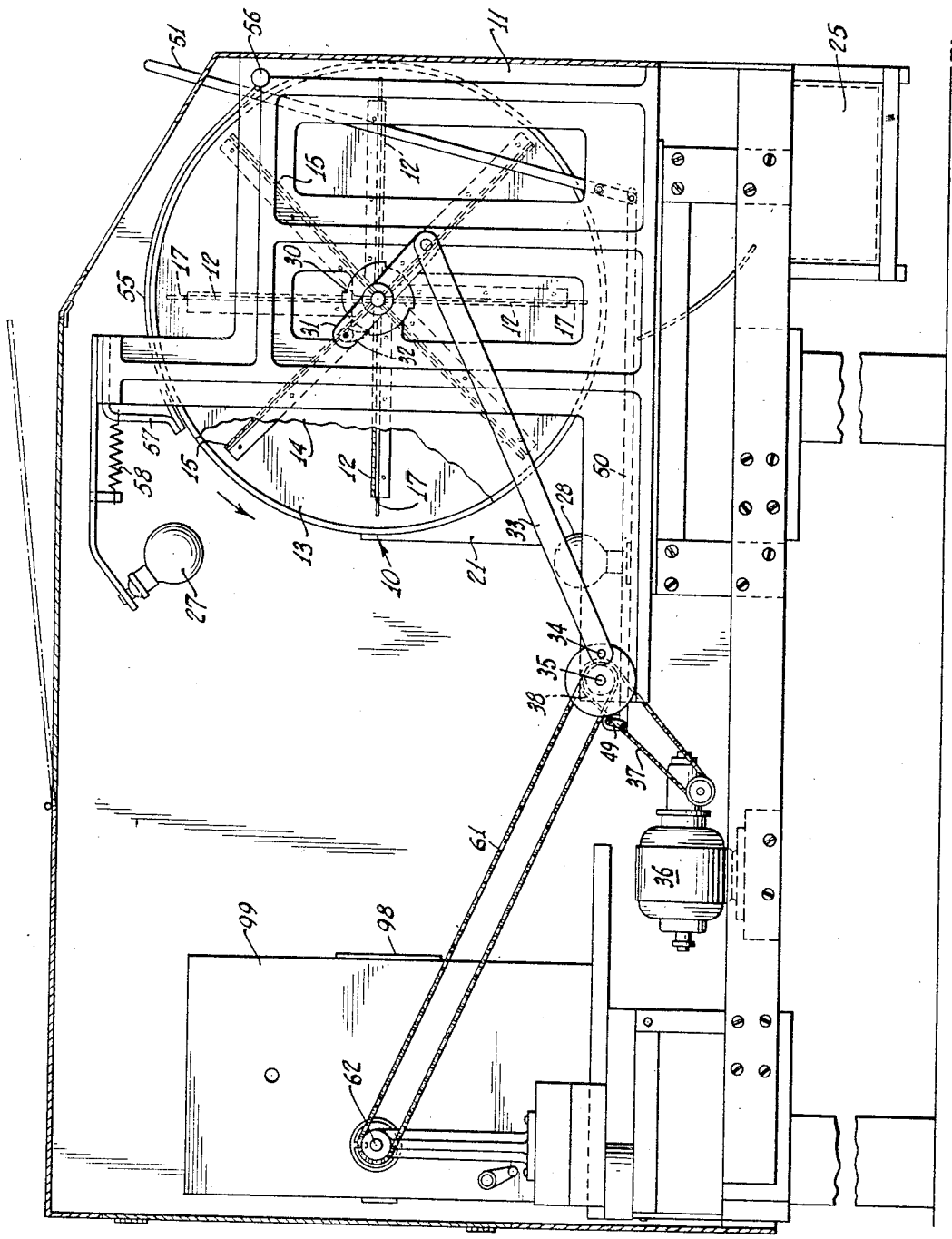
Fig. 1 is a side elevation of a device embodying my invention.

Referring to these figures, the device there shown includes two major assemblies. To the right of Fig. 1 is the record feeding and positioning assembly; to the left is the photographic apparatus.

Referring first to the positioning and feeding assembly, the carriage wheel 10 is rotatably mounted in the frame 11 and is provided at 90° intervals with transparent glass plates 12 secured in the positions shown between the ends or discs 13—14. Intermediate between the transparent plates 12 and radially positioned at 45° angles from the plates are the double mirrors 15. By "double mirrors" I mean that both sides of the mirror are suitably reflecting so that both the upper and lower faces of any record placed on one of these transparent plates 12 may be observed from a point beyond the edge of the plate by reflection in the angularly positioned mirrors above and below the transparent plate respectively.

At the edge of each plate 12 is a hinged lip 17 which is connected to a crank member 18, best shown in Fig. 3. This crank member 18 comprises two arms 19—20, 19 being provided with a pin which engages and rides along the cam member 21 fixed on the frame 11 to turn the lip up over the edge of the plate 12. The arm 20 at the proper time engages the fixed abutment or cam member 22 whereby the crank member 18 and the lip 17 are swung in an opposite direction.

As shown in Figs. 1 and 2, each lip 17 extends radially outward from the edge of its plate 12 during the rotation from the bottom of the wheel to the horizontal photographing position at the front of the wheel; and the lip is advantageously resiliently held in this position by a suitable spring. At the position shown in Fig. 3, the pin 19 begins to ride along the surface of the cam member 21 and thus the lip is raised into a position in which it holds the record against falling off from the plate 12 as the plate is moved downward through more and more steeply sloping positions until, at the point where the crank arm 20 contacts the member 22, the plate 12 has reached a position above the receptacle 25, whereupon further movement of the wheel 10 causes the arm 20 to swing backward, thus moving the lip 17 again into an aligned position and permitting the record theretofore retained on the plate 12 to slide off into the receptacle 25.

Above the machine preferably in a position between 90° and 135°, measured from the photographing position toward the top of the wheel 10, I provide a shelf for holding the records being fed into the machine. If feeding is to be done manually a simple shelf is sufficient; whereas if feeding is to be automatic this may carry a suitable mechanical or pneumatic feeding device mounted in this location.

As the wheel 10 rotates step by step the records are fed one at a time between the plate 12 and the following mirror 15. Each record drops by gravity to the bottom of the V-shaped space between the plate and the mirror and is automatically squared up by its own weight with one edge along the inner edge of this space. In order to avoid sticking of records by crowding into a V, the plates and mirrors preferably fit into a central hub of form designed to blunt the angle, and to guide the edge of the record away from the mirror 15. As the wheel rotates further the record falls over flat onto the plate 12. Thus, at the horizontal photographing position, it lies smoothly and properly aligned on the plate 12 without further manual adjustment.

Lamps 27 and 28 are provided as shown for illuminating respectively the top and the bottom of the records on the plates 12 when in the photographing position. In the position in which these lamps are shown they are both outside of the scope of the camera and so arranged with respect to the mirrors 15 that any spectral reflection, whether direct or multiple reflections along the surfaces of the mirrors and the plates 12 will be towards the center of the wheel and consequently will leave the reflected image of the record clear and free from glare which would tend to "fog" the image as photographed.

The rotation of the wheel 10 is accomplished, in the embodiment of my invention as illustrated in these drawings, by a reciprocating ratchet drive. The ratchet wheel 30 connected to the wheel 10, as shown, is provided with four teeth; so that with each stroke of the ratchet the wheel is moved 90°. Pivoted on the same shaft with the ratchet wheel 30 is the ratchet arm 31 which carries at one end the ratchet pawl 32 and at its other end is connected to the link 33, which in turn is eccentrically pivoted at 34 on the drive shaft 35.

The drive shaft 35 is driven from the motor 36 through the sprocket chain 37 and the sprocket 38 which is freely rotatable on the shaft 35, and intermittently engaged therewith through a clutch mechanism 38—47.

At one side of the sprocket 38 and integral therewith is a disc 39 provided with a pin 40; and opposite this pin on the same radius is a movable pin 41 which is provided with a shoulder 42 and slidably mounted in holes in the discs 43—44 each fixed on the shaft 35 for rotation therewith. A spring 46 between the disc 44 and the shoulder 42 urges the pin 41 toward the pin 40.

Adjacent the end of the pin 42 and the discs 43 and 44, as best shown in Fig. 6, is a disengaging cam 47 fixed on a shaft 48 on the end of which is a crank arm 49 connected through link 50 to the lever 51 which controls the operation of the machine. The cam 47 is urged into the disengaging position as shown in Fig. 2 and in Fig. 6, by the spring 52, but may be locked in the inoperative position by latching the lever 51 in its forward position in the slot 53, shown in Fig. 2.

With the lever 51 thus locked in the slot 53 the cam 47 is held away from the path of rotation of the shoulder 42. This pin 41 consequently is engaged by the pin 40 and the drive is transmitted therethrough, causing the discs 43—44 and the shaft 35 to rotate with the rotation of the sprocket 38 and through the eccentric pivot 34 to reciprocate the link 33 and through the ratchet 30—32 cause a step by step rotation of the wheel 10. When the lever 51 is moved back to the "disengage" position, the cam 47 drops back against the discs 43—44 and catches the shoulder 42 as it comes around and cams it to the left so that the pin 41 is disengaged from the pin 40 and the operation thus stops at a predetermined position with the shoulder 42 in the top of the cam slot in 47. If, now, the lever 51 is moved momentarily from the disengage position, the shoulder 42 will drop out of the cam member 47 and the pin 41 will spring back into the path of the pin 40, and will be engaged by it for one revolution until the shoulder 42 again meets the cam 47 and disengages the pin 41 and is stopped.

At the top of the discs 13—14 on the wheel 10 are provided brake straps 55, the rear ends of which are anchored to the pins 56 and the forward ends of which are secured on the brackets 57 slidably mounted in the frame 11 and urged forward by springs 58. The friction from these brake straps 55 is sufficient to overcome the momentum of the wheel at the end of its step movement by the ratchet, and thus prevents any overreaching of the ratchet operation, and thus assures accurate positioning of the records for photographing.

A second sprocket 60 fixed on the shaft 35 for rotation therewith drives the mechanism associated with the camera through a sprocket chain 61. This drive is transmitted through suitable connections to the shaft 62 which drives and inter-connects a film feeding mechanism, a shutter drive and a film clamping mechanism.

The film feeding mechanism is operated by the roller pin 63 on the disc 64 fixed to the shaft 62. The pin 63 engages one end of a rocker arm 65 pivoted on the film drive shaft 66 which carries at its opposite end the ratchet pawl 67 engaging the ratchet wheel 68. A clock spring 69 connected at one end to an anchoring pin 70 on the frame and at its other end to the rocker arm 65 serves to urge the rocker arm in a counterclockwise direction so as to return it ready for another stroke after each movement thereof caused by drive of the pin 63.

On the opposite end of the shaft 66 is mounted a film sprocket 80 of the kind commonly used in motion picture cameras. Beside this is a locking guide 81 also of conventional design. In order to avoid too great stress on the film in the camera, the two film sprockets are used in the embodiment illustrated with a slack loop of film between them. The second sprocket is shown at 82 with its locking guide 83. This sprocket is driven by means of the sprocket 84 on the shaft 66, the chain 85 and the sprocket 86 on the shaft 87, on which also is mounted the film sprocket 82. This shaft 87 also carries a pulley 88 which, through a spring belt, frictionally drives the reel shaft 89 on which is carried a conventional moving picture film spool 90.

The length of each stroke of the pawl 67, and therefore the length of film fed at each stroke, is dependent upon the length of the return stroke of the arm 65 which is effected by the spring 69 and this return stroke in turn is limited by an adjustable stop 71 on the shaft 72 operated by the handle 73, as shown, for example in Fig. 1. With the stop 71 in the position shown, the movement of the arm 65 is sufficient to feed the film a distance equal to that required for photographing both sides of the record. With the stop turned to its upper position it engages and limits the return movement of the arm 65 at approximately half its stroke, thus limiting the feeding of the film to that required for photographing only one side of the record.

The handle 73 and shaft 72 also control the mechanism for limiting the photographing to one side of the record. This, as shown in Fig. 9, is accomplished by a partial shutter or screen 75 mounted on a shaft 76, which in turn carries a crank 77 connected through the link 78 to the crank 79 on the shaft 72. When the handle 73 is moved from its double photographing position to its single photographing position, the stop 71 is raised into position to limit the feeding of the film to half the normal amount and at the same time the screen 75 is dropped into position to limit the photographic field to half its normal area.

The shutter mechanism used may be conventional, e. g., a rotating apertured disc, as in any ordinary moving picture camera and is not shown here in detail. It is driven from the shaft 62 by the pinions 91—92.

The film clamping mechanism consists of a stationary plate 93 accurately positioned to bring the sensitive surface of the film into the focal plane of the camera, having an aperture therein for passage of light of the focused image. Behind this is a clamping plate 94 urged toward the plate 93 by the spring 95 secured to the frame at 96. This spring is adapted to exert a pressure sufficient to assure proper positioning by clamping of the film between the plates 93 and 94. During movement of the film, however, the plate 94 is separated from the plate 93 by means of a cam 97 on the shaft 62 which is engaged by a cam follower 98 connected to or integral with the plate 94.

The funnels 88 make light tight contact at its periphery with the case at 96 and carries within it the lens system and shutter mechanism of the camera.

This entire mechanism is enclosed in a light tight case 99, shown in Figs. 1 and 2, 7 to 9 inclusive.

In the operation of this part of the mechanism the rotation of the shaft 62 first operates the shutter drive through the bevel pinions 91—92 to expose the film, which is then clamped between the clamping plates 93—94, to the focused image of whatever record may be supported on the horizontal plate 12 as reflected in the mirrors 15 above and below the plate. When the exposure of the film is complete and the shutter reclosed, the cam 97 engages the follower 98 to release the film by separating the clamping plate 94 from the plate 93. Thereafter the pin 63 engages the arm 65 and moves it thereby moving the ratchet 68, which it engages through the pawl 67, and thereby also moving the film sprockets 80 and 82 and, through the reel drive 88—89, turning the spool 90 to wind up the film which is pulled down through the camera against the friction drag of the reel spindle 100 and fed through the sprockets 80—82. At the end of the cycle, the clamping plate 94 is released from the cam 97 and pressed into clamping engagement with the film by the spring 95, the arm 65 is released from the pin 63 and moves back against the stop 71 under the influence of the spring 69; and thus the camera is reset ready for another exposure.

What I claim is:

1. A record photographing device which comprises a wheel having alternate radial transparent plates spaced 90° apart and mirrors which reflect on both sides thereof radially positioned at the 45° positions, a lip at the end of each plate rotatably mounted in the wheel to raise or lower the lip relative to the upper surface of said plate, a crank member on the end of each lip, a frame on which said wheel is rotatably mounted, a cam member on said frame in the path of said crank members to engage said crank and rotate it to raise the lip before it passes the horizontal position, and means on said frame in the path of said crank-member near the bottom of the wheel for engaging rotating the crank member to lower the lip, whereby to allow a record on said plate to slide freely therefrom, a receptacle below said wheel at the position of said last-named means for receiving records dropped from the plates, a table above and adjacent said wheel for holding records with its edge more than 90° and not over 135° from the photographing position as hereinafter specified, whereby to facilitate feeding of said records between each plate and its following mirror in turn, lamps positioned on said frame to illuminate the top and bottom of the plates when in the photographing position; a reciprocating ratchet drive adapted to rotate said wheel step-by-step, 90° at a step, brake means to detain said wheel from moving beyond the end of each 90° step, an automatic clutch adapted to disengage said drive after completion of one step and before beginning another, manually controlled means for disabling said disengaging means momentarily or for any desired period whereby to engage said drive for a single step or for as many successive steps as desired, a camera provided with a shutter and lenses directed toward said plates when they successively come to an approximately horizontal photographing position and adapted to focus on a film images of the top and bottom respectively of a record resting on the plate by reflection in the mirrors above and below said plate, means interconnected with said step-by-step drive for feeding film through said camera step-by-step between photographing of records, and means for operating the shutter to photograph each record while the wheel is at rest with one of its plates in photographing position, a partial shutter for said camera adapted to intercept and exclude from the film the image from one of the mirrors, means interconnected with said partial shutter for adjusting the film feeding means so that each step in the feed corresponds to the reduced area when said partial shutter is closed, a film clamp comprising a member having an accurately positioned surface adjacent the focal area of the camera adapted to position the film with its sensitive surface in the focal plane and a cooperating plate movable into and away from pressure relation to the first for clamping the film or releasing it for movement therebetween and having an aperture therein corresponding to the focal area, and means interconnected with the film feeding means and shutter operating means to release said clamping means before and during feeding of the film and to clamp it before and during operation of the shutter.

2. A record photographing device which comprises a rotary carriage wheel comprising alternate transparent plates and mirrors, the mirrors being angularly arranged on each side of said plates to reflect in the same outward direction respectively images of the top and bottom of any record placed on its surface, a camera positioned and focused to photograph both reflection from the mirrors of a pair when the plate between them is approximately horizontal, and means for positioning the wheel intermittently with said plates and mirrors successively in said approximately horizontal position, and means for illuminating both sides of said record when in said position.

3. A record photographing device which comprises a rotary carriage wheel comprising alternate transparent plates and mirrors, each pair of mirrors being angularly directed toward adjacent mirrors being angularly directed toward the adjacent side of the intermediate plate so that both reflect images of said plate in the same direction, means of said wheel for feeding records individually between in turn to each of said plates between it and the following mirror while said plates respectively are above the horizontal position, a camera positioned and focused to photograph simultaneously the images of the top and bottom of said record in the adjacent mirrors respectively when the plate carrying such record is in approximately horizontal position, means for discharging said records in turn from near the bottom of said wheel, means for rotating said wheel to bring each plate and pair of adjacent mirrors in turn into focusing position with respect to said camera and means for operating said camera to photograph said records successively when their respective plates and mirrors are in said approximately horizontal positions.

4. A device as defined in claim 3, which further comprises means for moving a strip of photographic film through the camera to expose successive areas thereof for photographing said records respectively, a partial shutter adapted to intercept the image of one of the mirrors and exclude it from said film, means interconnecting said film moving means with the means for rotating the wheel and the means for operating the camera, and means for closing said partial shutter and simultaneously changing the ratio of said film moving device to said interconnected parts so as to feed only half as much film for each exposure.

5. A record photographing device which comprises a rotary carriage wheel comprising angularly spaced transparent plates and mirrors, on each side of each plate angularly directed toward the opposite sides of the plate so as to reflect images thereof respectively toward a common point outside said wheel, a camera directed toward said mirrors and positioned so that said common point for each pair of mirrors successively will fall at said camera as the wheel is rotated to bring the plates successively into an approximately horizontal position, step-by-step driving means adapted to move the wheel successively to bring successive plates into said position, film feeding means interconnected with said wheel, driving means for feeding an amount of film through the camera at each step of the wheel sufficient for one exposure, camera operating means interconnected with the wheel driving means adapted to expose the film while each plate is in said approximately horizontal position.

6. A device as defined in claim 5, which further comprises a partial shutter movable to intercept the image from one of the mirrors and exclude it from the photographic film, means for reducing the rate of feeding of the film, and means for simultaneously operating said shutter to reduce said feed and close said shutter or to open said shutter and restore said feed at will.

7. A device as defined in claim 5, which further comprises a film clamping device comprising a member having an accurately positioned surface adapted to hold the film at the focal plane of the camera adjacent the focal area of the camera, and a cooperating member adapted to press against the first adjacent said focal area, said members being separable to accommodate free movement of a film between them and movable into pressure relation to exactly position said film at the focal plane of the camera, and means interconnected with the film feeding means and the camera operating means for clamping the film in said position before and during exposure and releasing the film before and during feeding thereof.

8. A record photographing device, which comprises a wheel having angularly related alternate mirror and transparent plates diverging toward the periphery of the wheel, adapted to receive a sheet between them, a movable lip pivotally mounted on the outer edge of the transparent plate, means for raising said lip above the surface of said plate, a predetermined point in its rotation with the wheel whereby to hold said sheet against sliding off said plate, and means to lower said lip at a predetermined point in its rotation with the wheel at which said plate is downwardly directed, whereby to discharge said sheet from said plate, and a camera positioned at one side of said wheel and focused on diverging mirrors when in one position, whereby to photograph simultaneously both sides of a sheet lying on one of said transparent plates as reflected in said adjacent mirrors.

FRANK E. OILER.